H. AVERAY-JONES.
CAN SOLDERING MACHINE.
APPLICATION FILED JUNE 3, 1915.

1,187,803.

Patented June 20, 1916.
10 SHEETS—SHEET 1.

Fig. 1.

Inventor: Herbert Averay-Jones
By his attorneys,

H. AVERAY-JONES.
CAN SOLDERING MACHINE.
APPLICATION FILED JUNE 3, 1915.

1,187,803.

Patented June 20, 1916.
10 SHEETS—SHEET 2.

Fig. 2.

Inventor:
Herbert Averay-Jones.
By his Attorneys,

H. AVERAY-JONES.
CAN SOLDERING MACHINE.
APPLICATION FILED JUNE 3, 1915.

1,187,803.

Patented June 20, 1916.
10 SHEETS—SHEET 7.

Inventor:
Herbert Averay-Jones
By his Attorneys,
Baldwin Wight

H. AVERAY-JONES.
CAN SOLDERING MACHINE.
APPLICATION FILED JUNE 3, 1915.

1,187,803.

Patented June 20, 1916.
10 SHEETS—SHEET 9.

Fig. 12.

Inventor,
Herbert Averay-Jones
By his Attorneys,
Baldwin Wright

UNITED STATES PATENT OFFICE.

HERBERT AVERAY-JONES, OF STONE HOUSE, FOWNHOPE, ENGLAND, ASSIGNOR OF ONE-HALF TO THE ASIATIC PETROLEUM COMPANY LIMITED, OF LONDON, ENGLAND.

CAN-SOLDERING MACHINE.

1,187,803.    Specification of Letters Patent.    Patented June 20, 1916.

Application filed June 3, 1915. Serial No. 31,969.

*To all whom it may concern:*

Be it known that I, HERBERT AVERAY-JONES, a subject of the King of Great Britain, residing at Stone House, Fownhope, in the county of Hereford, England, have invented a new and useful Can-Soldering Machine, of which the following is a specification.

This invention relates to machines for soldering cans and is particularly adapted for soldering the seams at the bottom and top of cans such as are used for containing petroleum.

In carrying out the invention the can is supported at an angle on a slide and means are provided for turning the can over and over so that the seams at the bottom of the sides of the can are immersed in turn in a bath of acid situated at the bottom of the slide, and subsequently in a bath of solder. The can is then turned over end for end and the seams at the top of the sides of the can are immersed in turn in a second bath of acid situated below the slide and subsequently in a second bath of solder.

The mechanism for turning over the cans is such that the movement is uniform and each part of the seam remains the same length of time in the acid or solder bath. The mechanism also causes the can to be moved forward while it is being turned. Moreover part of a seam or a corner of the can remains beneath the liquid in the bath until the whole seam has passed through it.

In the drawings which illustrate the invention

1 are standards for supporting the machine. Mounted upon the standards are an angle (bar 2), plate 3 and arms 4 carrying the bar 5. The angle bar 2, plate 3 and bar 5 form between them the slide for supporting the cans.

Mounted upon the standards 1 are the acid and solder baths 7 and 8 respectively, each bath being so situated that the lowest seam of a can on the slide dips into the acid or solder in the bath.

Figure 15:
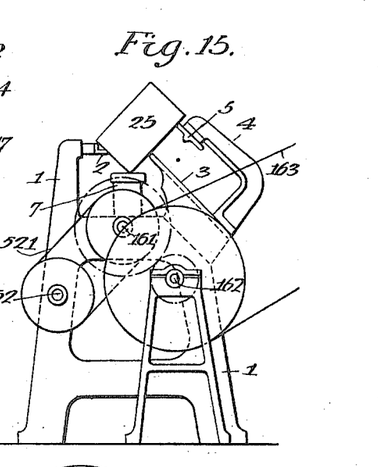
Fig. 15 is an end view.

The mechanism for turning the cans and passing them through the acid and solder baths is as follows: 9 are turning levers, eight of which are employed for passing a can through an acid and a solder bath. The turning levers 9 are pivoted to a bar 10 which can slide upon studs 11 carried by the horizontal arms of bell crank levers 12 pivoted to the plate 3 at 13. To and fro movement is imparted to the sliding bar 10 by a connecting rod 14 actuated by a crank pin 15 on a crank shaft 16 driven by bevel gear from a shaft 161 geared as shown in Fig. 15 to a shaft 162 driven by a belt 163.

In order to impart up and down movement to the sliding bar 10, the vertical arms of the bell crank levers 12 are coupled together by a coupling rod 17, and the end of the vertical arm of the bell crank lever nearest to the shaft 16 is connected by a link 18 to the end of a rod 19 driven by the crank pin 15; the end of the rod 19 is also pivoted to one end of an arm 20 which is pivoted to the plate 3 at 21. When the crank 15 is at the top of its stroke the rod 19 is substantially at right angles to a line joining the end of the vertical arm of the bell crank lever 12 and the fixed pivot 21, while the links 18 and 20 are also at the same time substantially in line with one another so that very little movement is imparted to the bell crank levers 12 and consequently there is very little up and down movement of the sliding bar 10 when this latter is in its upper position. The turning levers 9 have downwardly extending arms 22 pivoted to a bar 23 which is actuated by a connecting rod 24 on a crank pin 241 on the crank pin 15. The cans are shown at 25.

By means of the mechanism just described a can placed upon the slide, where it will rest at an angle of 45° with one seam in the acid bath 7, is turned through a right angle by the first turning lever 9 so that the seam on the second side of the can is immersed in the bath; the second turning lever 9 turns the can through another right angle so that the third seam is immersed and the third lever 9 turns the can through another right angle so that the fourth seam is immersed. The fourth lever 9 turns the can through another right angle at the same time pushing it along the slide into the solder bath 8 where the first seam is soldered. The fifth, sixth and seventh levers 9 turn the can over so that the remaining seams are soldered. The eighth lever 9 then turns the can, moving it out of the solder bath and leaves it on the slide ready to be turned over end for end as will be hereinafter described.

The different positions taken by the levers 9 in turning a can through a right angle are shown in Figs. 3, 4, 5 and 6 and the mechanism for effecting the turning movement will now be described in detail.

Figure 3:
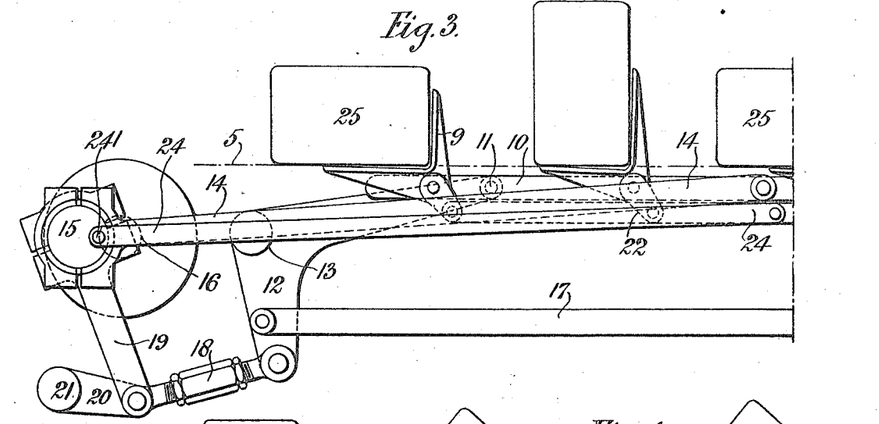
Figs. 3, 4, 5 and 6 are views looking in the direction of the arrow in Fig. 2 showing four turning levers and the mechanism for operating them.
Figure 4:
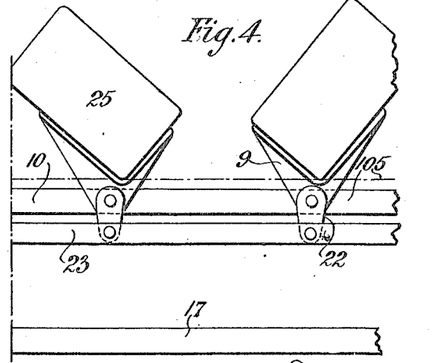

In Fig. 3 it will be seen that the left extremities of the horizontal arms of the turning levers 9 are in contact with the cans 25. As the crank shaft 16 turns clockwise the connecting rod 14 is moved by the crank pin 15 to the right, moving with it the sliding bar 10 on which the turning levers 9 are pivoted. At the same time the crank pin 241 moves the connecting rod 23 (to which the downwardly extending arms 22 of the turning levers 9 are pivoted) also to the right but a shorter distance than the sliding bar 10 is moved so that the bar 23 moves to the left relatively to the sliding bar 10, thus tilting the turning levers 9 and cans 25 to the position shown in Fig. 4.

Figures 5, 6:
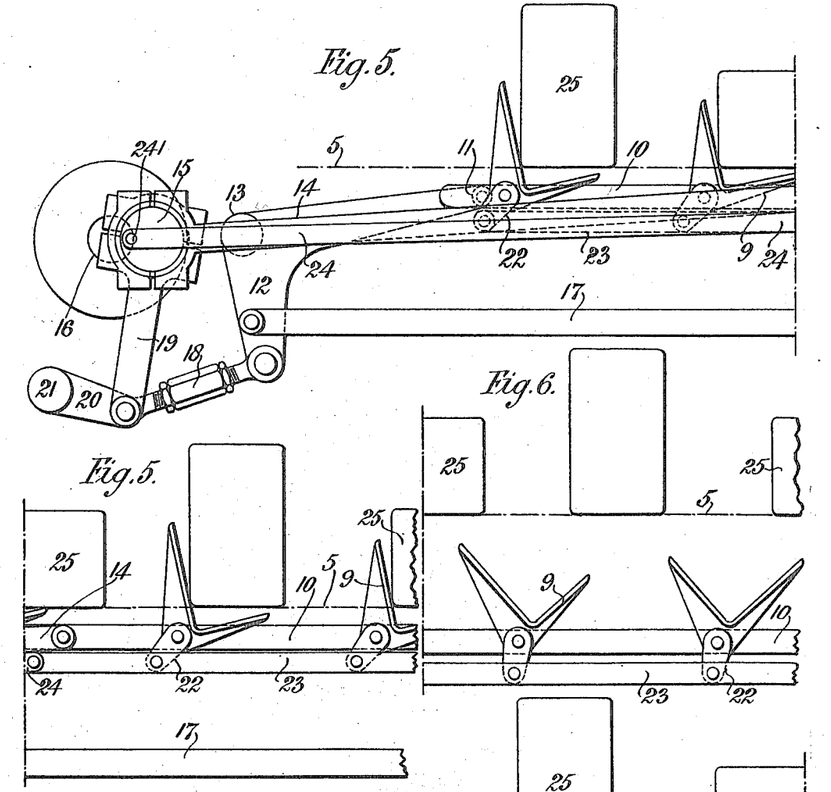
Figure 6:
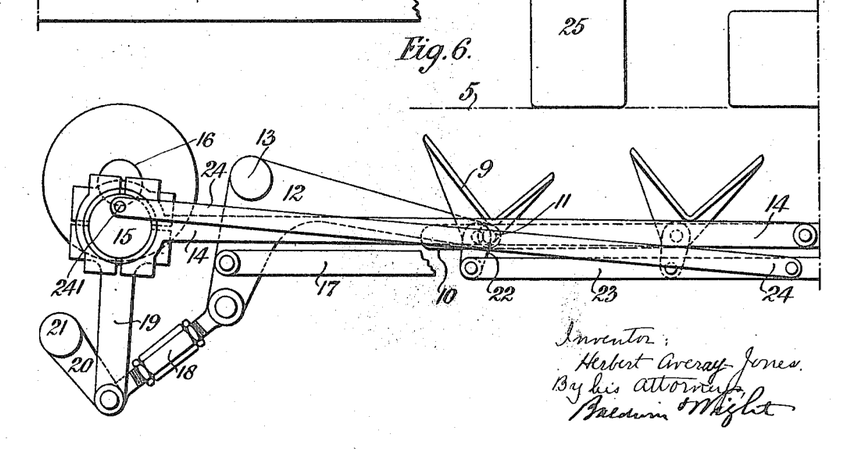

When the crank shaft 16 has been moved through another quarter turn, as shown in Fig. 5, the connecting rod 14 and turning levers 9 have been moved still farther to the right by the crank pin 15, the crank pin 241 has moved the bar 23 to the right but a shorter distance (since the throw of the pin 241 is less than that of the pin 15), as a result the turning levers 9 have been still further tilted. At the same time the connecting rod 19, acting through the links 18 and 20 upon the bell crank levers 12 has commenced to lower the sliding bar 10 and with it the turning levers 9, and the can which has been turned over through a right angle has been left upon the slides formed by the angle bar 2, plate 3 and bar 5.

When the crank shaft 16 has been moved another quarter turn as shown in Fig. 6, the sliding bar 10 has been moved to the left and so has the connecting rod 23 but a shorter distance than the sliding rod 10, thereby tilting the turning levers to the left; at the same time the connecting rod 19 acting through the links 18 and 20 has rocked the bell crank levers 12 and lowered the sliding bar 10 and with it the turning levers 9 so that they are clear of the cans 25. As the crank shaft 16 is moved the remaining quarter turn, the sliding bar 10 is moved still farther to the left, the connecting rod 23 and with it the arms 22 of the turning levers 9 are also moved to the left, but a shorter distance, the turning levers 9 are tilted over to the left until their left hand arms are nearly horizontal; at the same time the connecting rod 19 acting through the links 18 and 20 and the bell crank lever 12, on the sliding bar 10, raises it, together with the turning levers 9, to the position shown in Fig. 3, where the turning levers 9 are ready to give another turning movement to the cans.

After a can has been passed through the first acid and solder baths 7 and 8 it is turned over end for end by the following mechanism:—26 are turning arms mounted upon shafts 27, 28 turning in bearings 29 carried by the plate 3; the shaft 27 is driven by a shaft 30 through a bevel wheel 31 which engages with a pinion 32 on the shaft 27. The shaft 30 receives step by step motion from the sliding bar 10 which is connected by a link 33 to an arm 34 fast with the shaft 30. The arm 34 carries a pawl 35 engaging with a ratchet wheel 36 on the bevel wheel 31 which is free to rotate on the shaft 30.

Figure 1:
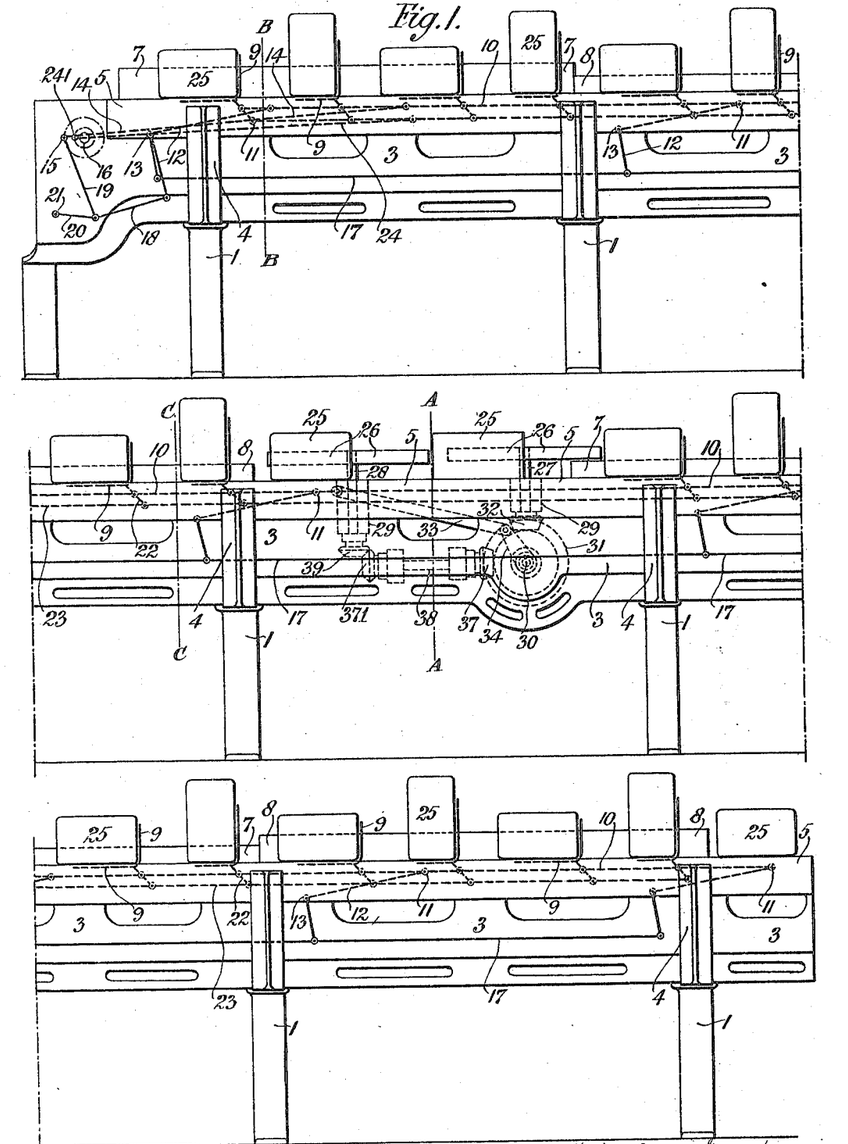
Figure 1 is a view which is partly diagrammatic of the machine looking in the direction of the arrow in Fig. 2.
Figure 2:
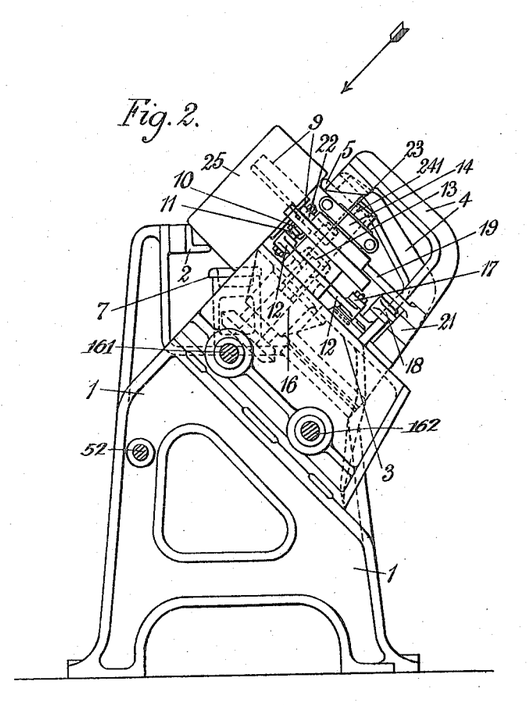
Fig. 2 is an end view of the machine with the driving mechanism removed.
Figure 7:
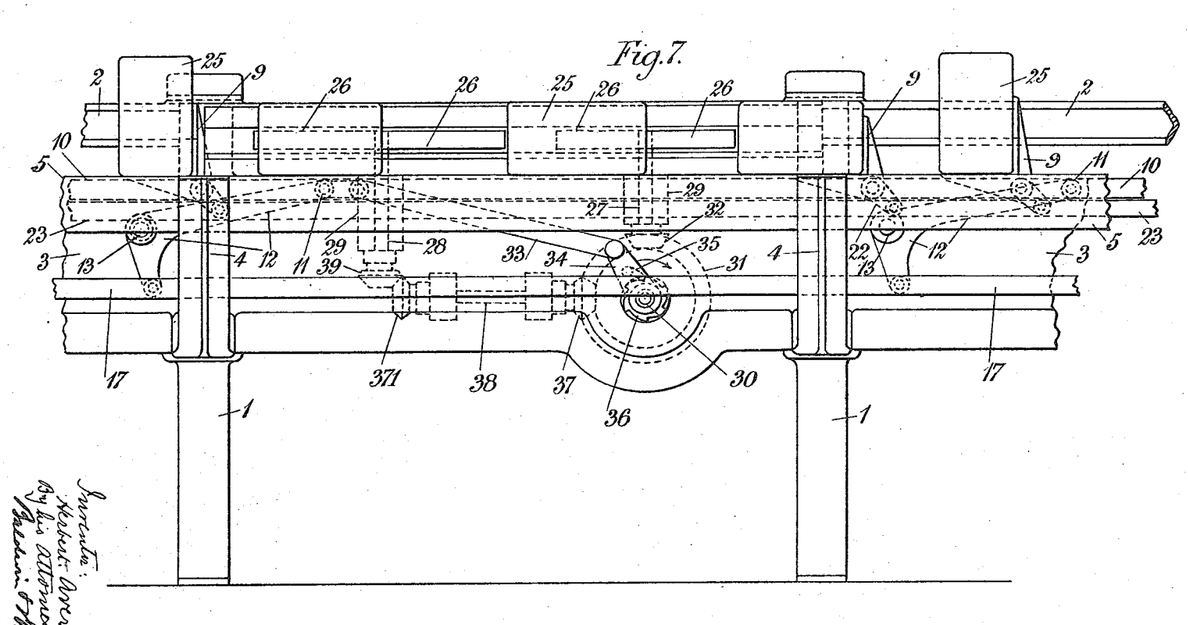
Fig. 7 is a side view, and Fig. 8 a local section on the line A—A Fig. 1, showing the mechanism for turning a can end for end.
Figure 8:
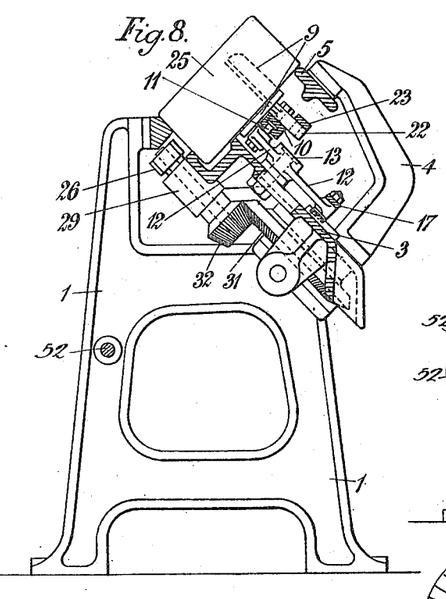
Figure 9:
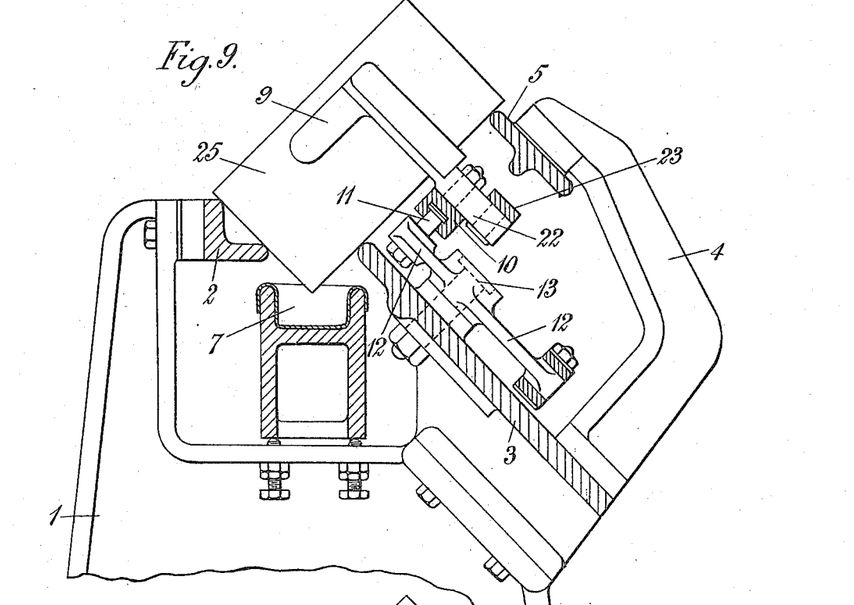
Figs. 9 and 10 are local sections on the lines B—B, C—C, Fig. 1 showing an acid and solder bath respectively.
Figure 10:
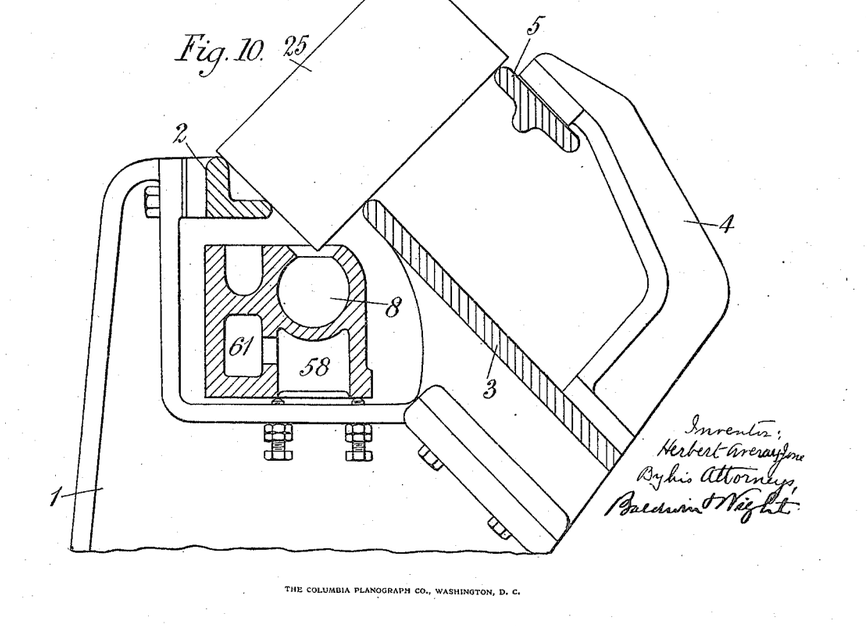
Figure 11:
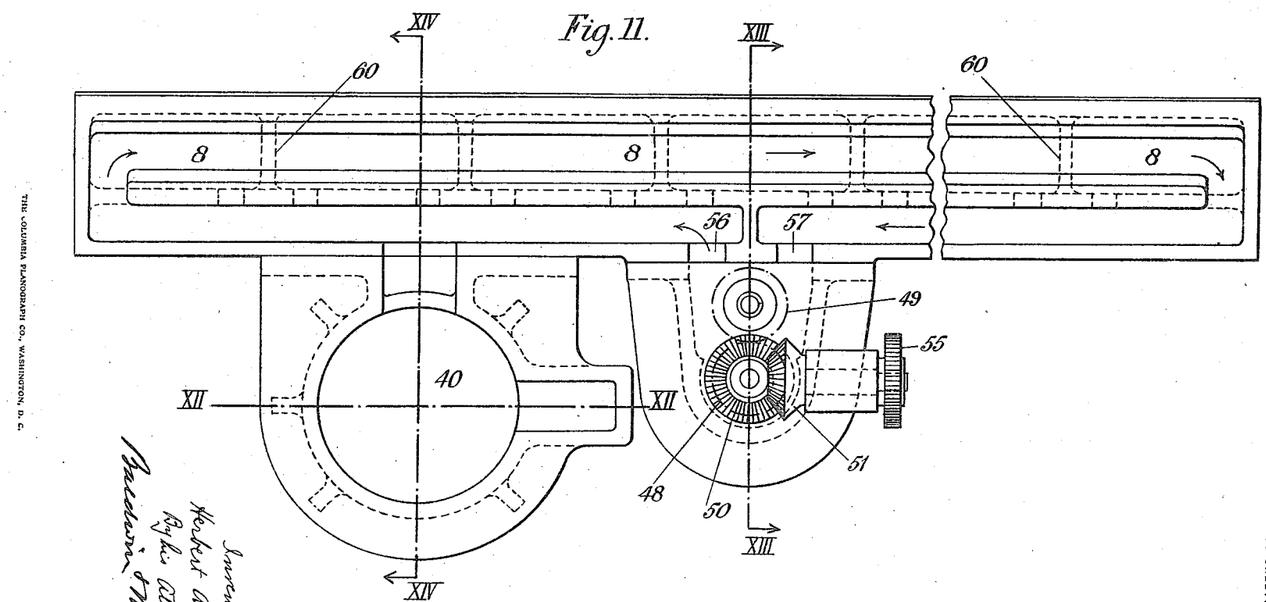
Fig. 11 is a part plan showing a solder bath, well and circulating pump.

The bevel wheel 31 drives the pinion 32 at four times its speed and is driven an eighth of a revolution by the sliding bar 10 so that the shaft 27 (with its arm 26) is driven half a revolution for every revolution of the crank shaft 16. The shaft 28 (with its arm 26) is turned through half a revolution at each revolution of the crank shaft 16, by a bevel wheel 37 gearing with the wheel 31 and fast on a shaft 38 which has also fast on it a wheel 371 meshing with a bevel wheel 39 on the shaft 28. As will be seen on referring to Figs. 1 and 7 a can from the first solder bath 8 is turned over upon its side by the arm on the shaft 28 at the end of one revolution of the crank shaft 16, and is pushed by the continued movement of such arm until it rests over one of the arms of the shaft 27. At the end of another revolution of the crank shaft 16 is turned over upon its end by the arm 26 on the shaft 27 so that the bottom of the can 25 is now uppermost and one seam at what was originally the top of the can 25 is immersed in the second acid bath 7. The can is then passed through this second acid bath 7 and a second solder bath 8 by eight turning levers 9 which are identical with the turning levers 9 already described.

Figure 12:
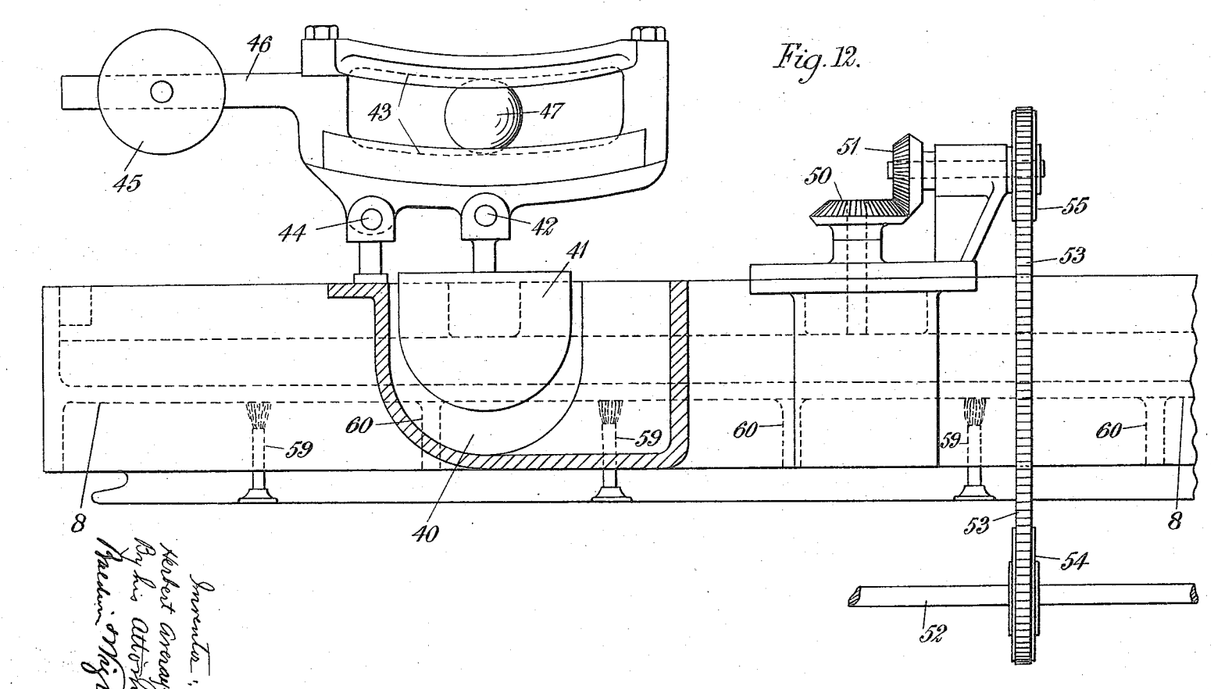
Fig. 12 is a section on the line XII—XII Fig. 11.
Figure 13:
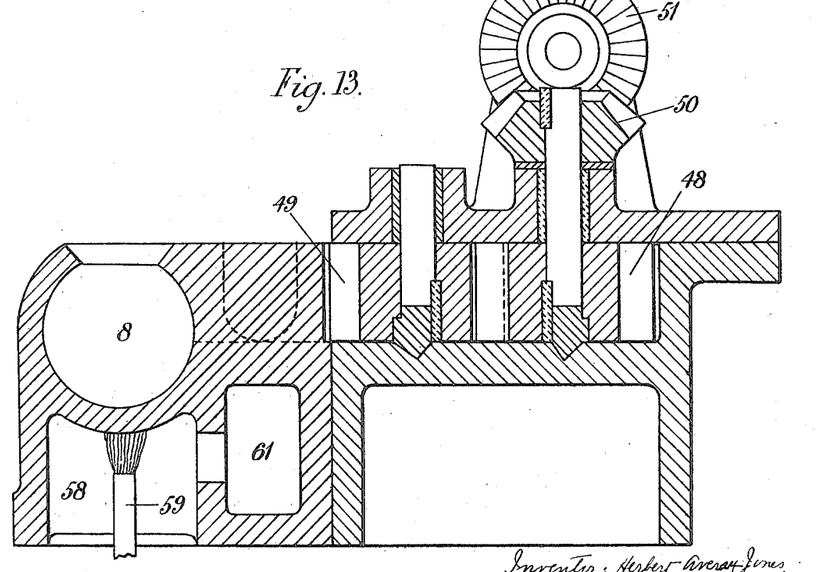
Figs. 13 and 14 are to a larger scale, Fig. 13 being a section on the line XIII—XIII Fig. 11, and Fig. 14 a section on the line XIV—XIV Fig. 11.
Figure 14:
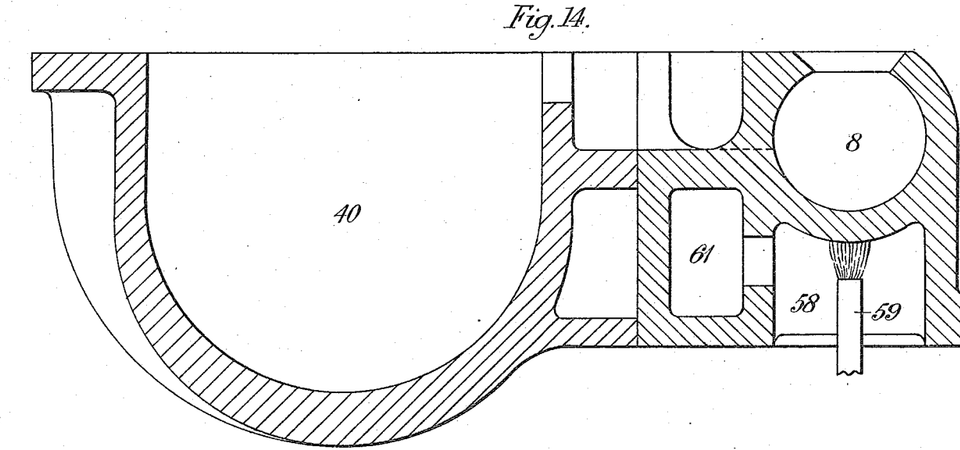

It is obvious that a machine which thus turns the cans over automatically is capable of soldering them with great rapidity and that the level of the solder in the solder bath 8 would quickly be lowered if means were not provided to compensate for the solder as it is used up. In order to effect this compensation the arrangement shown in Fig. 12 is employed.

40 represents a well communicating with the bath 8 in which is a float 41, pivoted at 42 to the frame 43, which in turn is pivoted at 44. The frame 43 is provided with a counterweight 45 which can be slidden upon an arm 46 and contains a weight 47 adapted to roll along it as the float sinks thus increasing the weight of the float and displacing more solder to compensate for that which is used.

Figs. 11, 12, 13 and 14 show means for equalizing the temperature of the solder in the bath 8. 48 and 49 are gear wheels which form a pump for circulating the solder. The gear wheel 48 is provided at the end of its shaft with a bevel wheel 50 driven by a bevel 51 which in turn is driven by a shaft 52 driven by a belt 621 from the shaft 161, see Fig. 15, through a chain 53 and sprocket wheels 54, 55. The gear wheels 48 and 49 cause the solder to flow through port 56 as indicated by the arrows along the bath and back through a port 57 to the pump.

In order to equalize the temperature of the solder, the passage 58, heated by burners 59, is divided by partition 60 communicating with the main flue 61.

What I claim is:—

1. In a machine for soldering cans, a bath containing liquid, a slide above the bath adapted to support a can with its edge or corner dipping into the liquid, a bar, a plurality of turning levers pivoted thereto, a rotating shaft, a crank pin thereon, a rod connecting the crank pin and bar, a second crank pin, a rod connecting it to said turning levers, a bell crank lever slidably pivoted to the bar, a crank pin, a connecting rod on said crank pin, a link connecting said bell crank lever to said connecting rod, and a link adapted to oscillate on a fixed pivot and connected to the last mentioned rod.

2. In a machine for soldering cans, a bath containing liquid, a slide above the bath adapted to support a can with its edge or corner dipping into the liquid, a bar, means for reciprocating the bar endwise, a plurality of turning levers pivoted thereto, mechanism adapted to actuate the said levers whereby a can is turned over and moved along the slide, arms adapted to turn a can end for end, and mechanism operated by the movements of said bar and adapted to turn said arms.

3. In a machine for soldering cans, a bath containing solder, a slide adapted to support a can with its edge or corner dipping into the solder, a plurality of turning levers, mechanism adapted to actuate said levers whereby a can is turned over and moved along the slide, a frame pivoted to said bath, a float pivoted to the frame, and a rolling weight in the frame.

HERBERT AVERAY-JONES.

Witnesses:
HENRY ERNEST GRIBBLE,
WALTER JOHN TAYLOR.

Copies of this patent may be obtained for five cents each, by addressing the "Commissioner of Patents, Washington, D. C."